United States Patent

Reymond et al.

[15] 3,668,645

[45] June 6, 1972

[54] PROGRAMABLE ASYNCHRONOUS DATA BUFFER HAVING MEANS TO TRANSMIT ERROR PROTECTED CHANNEL CONTROL SIGNALS

[72] Inventors: Welles K. Reymond, Noroton Heights; Walter V. Ciecierski, Ridgefield, both of Conn.

[73] Assignee: General Datacomm Industries, Norwalk, Conn.

[22] Filed: May 25, 1970

[21] Appl. No.: 40,006

[52] U.S. Cl. ....................340/172.5, 179/15 AS, 179/15 BA

[51] Int. Cl. ....................G06f 3/00

[58] Field of Search ..............340/172.5; 178/50; 179/15 AS, 179/15 BA

[56] References Cited

UNITED STATES PATENTS

| | | | |
|---|---|---|---|
| 3,307,152 | 2/1967 | Robbins | 340/172.5 |
| 3,516,073 | 6/1970 | Goss et al. | 340/172.5 |
| 3,263,219 | 7/1966 | Brun et al. | 340/172.5 |
| 3,340,515 | 9/1967 | Little | 340/172.5 |
| 3,465,302 | 9/1969 | Andrews | 340/172.5 |
| 3,504,348 | 3/1970 | Hallman | 340/172.5 |

*Primary Examiner*—Paul J. Henon
*Assistant Examiner*—Melvin B. Chapnick
*Attorney*—Pennie, Edmonds, Morton, Taylor and Adams

[57] ABSTRACT

Programable transmitting and receiving data buffers and formatters are provided which accept start-stop data that is formatted by removing the start-stop pulses and coded for transmission with a primary data indicator bit. Secondary channel control data with an identifying indicator bit is automatically inserted in the transmission time slot when primary data is not available. A method and means are provided for separating primary data from secondary control data at the receiver and delivering error protected control signals.

7 Claims, 7 Drawing Figures

INVENTORS
WELLES K. REYMOND
WALTER V. CIECIERSKI

BY

Pennie, Edmonds, Morton, Taylor & Adams
ATTORNEYS

INVENTORS
WELLES K. REYMOND
WALTER V. CIECIERSKI

BY

Pennie, Edmonds, Morton, Taylor & Adams
ATTORNEYS

INVENTORS
WELLES K. REYMOND
WALTER V. CIECIERSKI

BY

Pennie, Edmonds, Morton Taylor & Adams.
ATTORNEYS

INVENTORS
WELLES K. REYMOND
WALTER V. CIECIERSKI
BY
Pennie, Edmonds, Morton
Taylor & Adams
ATTORNEYS INVENTORS
WELLES K. REYMOND
WALTER V. CIECIERSKI
BY
Pennie, Edmonds, Morton, Taylor & Adams
ATTORNEYS INVENTORS
WELLES K. REYMOND
WALTER V. CIECIERSKI
BY
Pennie, Edmonds, Morton, Taylor & Adams
ATTORNEYS

INVENTORS
WELLES K. REYMOND
WALTER V. CIECIERSKI

BY

Pennie, Edmonds, Morton, Taylor & Adams

ATTORNEYS

PROGRAMABLE ASYNCHRONOUS DATA BUFFER HAVING MEANS TO TRANSMIT ERROR PROTECTED CHANNEL CONTROL SIGNALS

BACKGROUND OF THE INVENTION

The subject invention relates to time division multiplex systems of the character interleaved type.

In many practical data communication systems such as those used in conjunction with time shared computers and the like, there exists the need to transmit various types of secondary data such as supervisory and status control signals, channel validation test signals, etc. It has been common practice in the prior art to assign one of the plural channels for the transmission of nothing but secondary data. Aside from being uneconomical, this approach has an important disadvantage of not providing individual control service from each channel source to its associated sink.

In accordance with the present invention, programable asynchronous buffers are provided which automatically combine primary and secondary data at each channel input so that from the point of view of the transmission medium there is only one source of data for each channel. Distinctive indicator bits are transmitted with the respective primary and secondary data characters which make possible the positive identification of each character. A multiple step comparison method and digital filter means are provided as part of the invention which assures the transmission of error protected channel control data.

Figure 1:
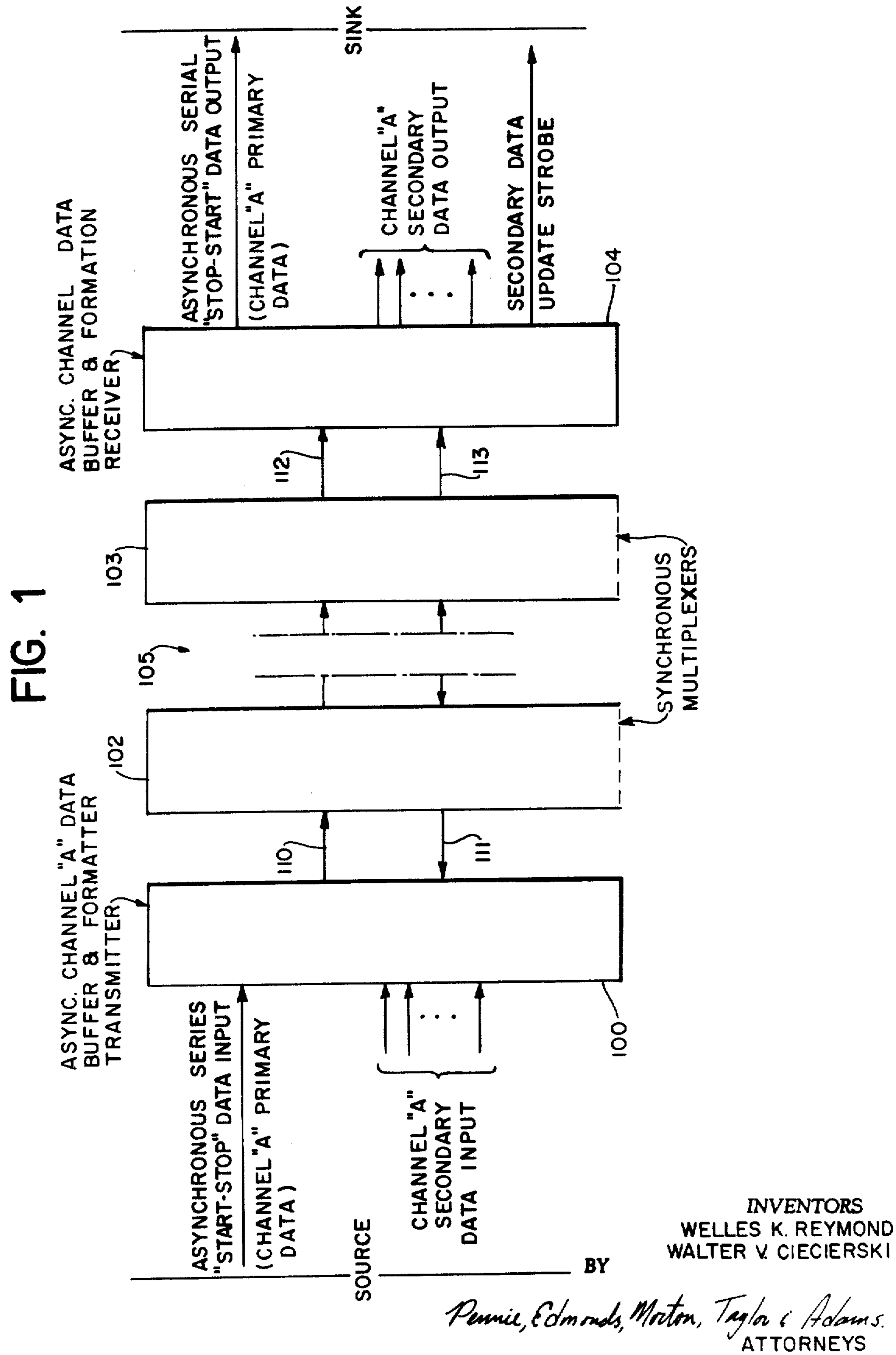
FIG. 1 is a simplified system block diagram of a time division multiplexer utilizing the apparatus and methods of the invention.

A simplified block diagram illustrating the cooperative operation of a single channel pair of transmitting and receiving asynchronous buffers provided by the present invention is illustrated in FIG. 1. It is to be understood that in a practical system, a plurality of such asynchronous transmitting and receiving buffers would be combined, one pair for each data channel, to provide a multiple channel, character interleaved, time division multiplex data transmission system. For purposes of simplifying the explanation of the present invention, cooperating time division synchronous multiplexers and high speed transmission modems are not shown in the drawings and will not be described herein. The attendant advantages offered by the asynchronous data buffers of the present invention may be utilized with a variety of such well known existing devices.

Referring to FIG. 1, there is shown a transmitting asynchronous data buffer 100 having input means to receive both digital primary data (i.e., from Teletype, punch card machines, etc.) and digital secondary data. For purposes of this specification, the term "secondary data" is defined to include a variety of supervisory and test control signals which are inserted on operator's command by the particular channel buffer whenever primary data is not being transmitted in the assigned channel time slot. A channel "A" data character, either primary or secondary, is removed as a character burst via 110 from temporary storage in 100 at least once every frame interval by synchronous multiplexer 102, which supplies burst timing readout signals via 111 as shown. Channel A data characters are interleaved with data characters from other such buffers and transmitted as a composite data stream over high speed transmission facility 105.

At the receiving end, the composite data stream is separated frame by frame into its component data characters by synchronous demultiplexer 103. Channel "A" data characters and synchronous burst timing signals are supplied by 112 and 113 to the receiver asynchronous data buffer 104 which functions to identify and separate the channel primary data from the secondary data and supply each respective character to its appropriate sink.

Figure 2:
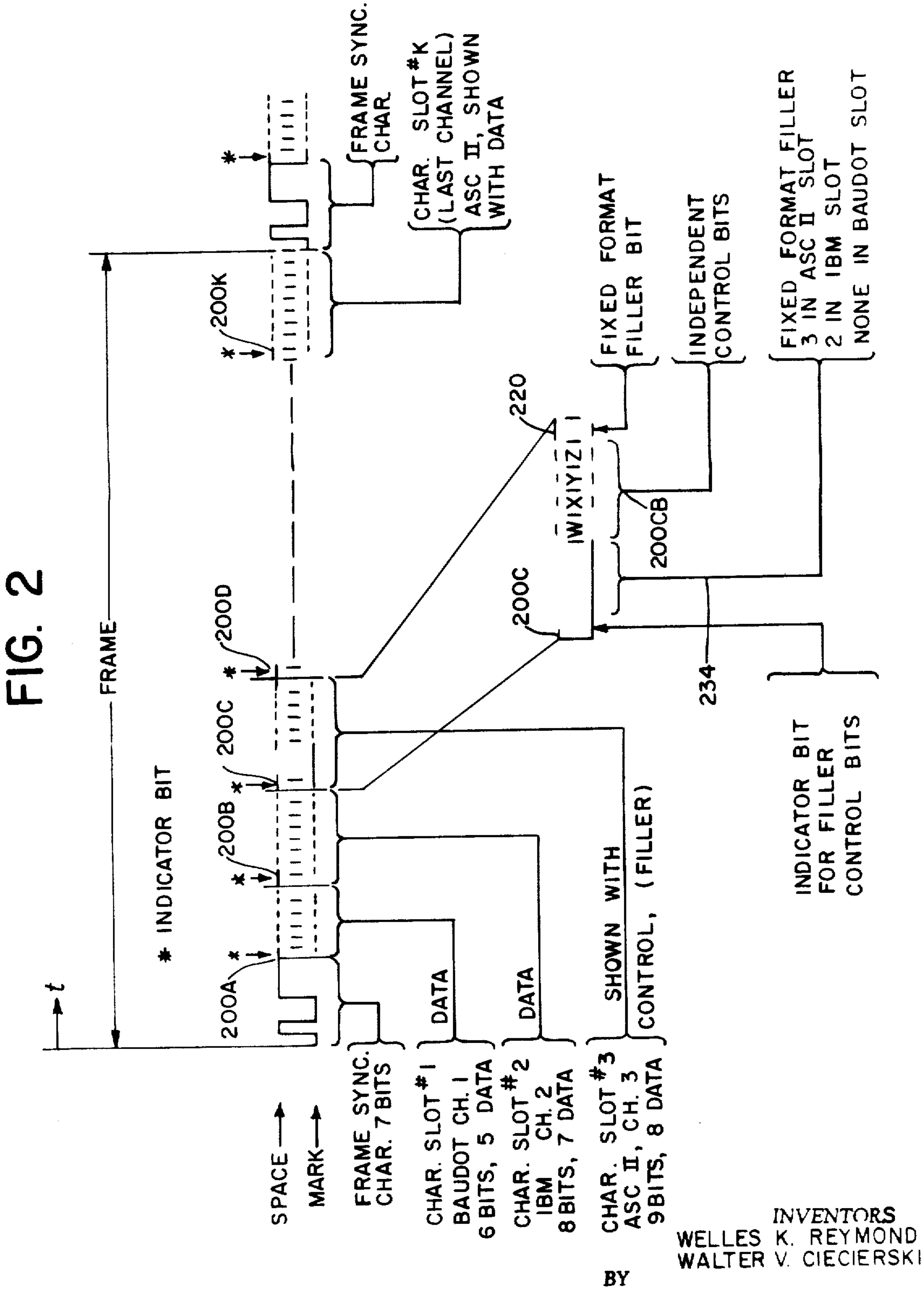
FIG. 2 shows an illustrative example of a time division multiplex frame having both primary data characters and secondary control data characters.

Reference is made next to FIG. 2 which shows an illustrative example of a time division multiplex frame having primary channel data characters interleaved with secondary channel data characters and accompanying primary and secondary indicator bits. The specific identifying functions performed by the respective primary data and secondary data indicator bits will be described more fully hereinafter in conjunction with FIGS. 3–7. As shown in FIG. 2, each frame typically comprises a plurality of data character time slots 1–K and a frame channel time slot which may be used to transmit a seven bit Barker code, for example, to effect frame synchronization. Advantageously each data character time slot is programmed to just accommodate the number of character bits used by the particular machine supplying data to that assigned channel (e.g., ASCII nine bits; IBM eight bits; Baudot six bits, etc.). Where desired, however, the asynchronous data buffers of the present invention may be operated in a character interleaved time division multiplex system wherein all data slots are of equal time duration. In either operation, in accordance with a principal feature of this invention, a distinctive protected indicator bit is utilized with the inserted secondary control data which makes possible extremely reliable identification of this data without interference or interruption of either the primary channel data transmission in that time slot or the transmission of data in any other time slot in the frame. As shown, in FIG. 2, the transmission of each primary data character is simply identified by the insertion of an initial space indicator bit 200A–200K followed by the particular data bits in any given character.

When start-stop data is not available from the data source or buffer at the time its assigned time slot occurs, secondary control data is automatically inserted in that slot having an initial mark indicator bit 200C, four programable digital control bits 200CB and, a fixed format filler space 220. The remaining bits, if any, may advantageously be fixed format filler marks 234 which can be used for verification purposes. An important system advantage offered by the use of an identifying indicator bit is the fact that the system is transparent to all start-stop codes.

Figure 3:
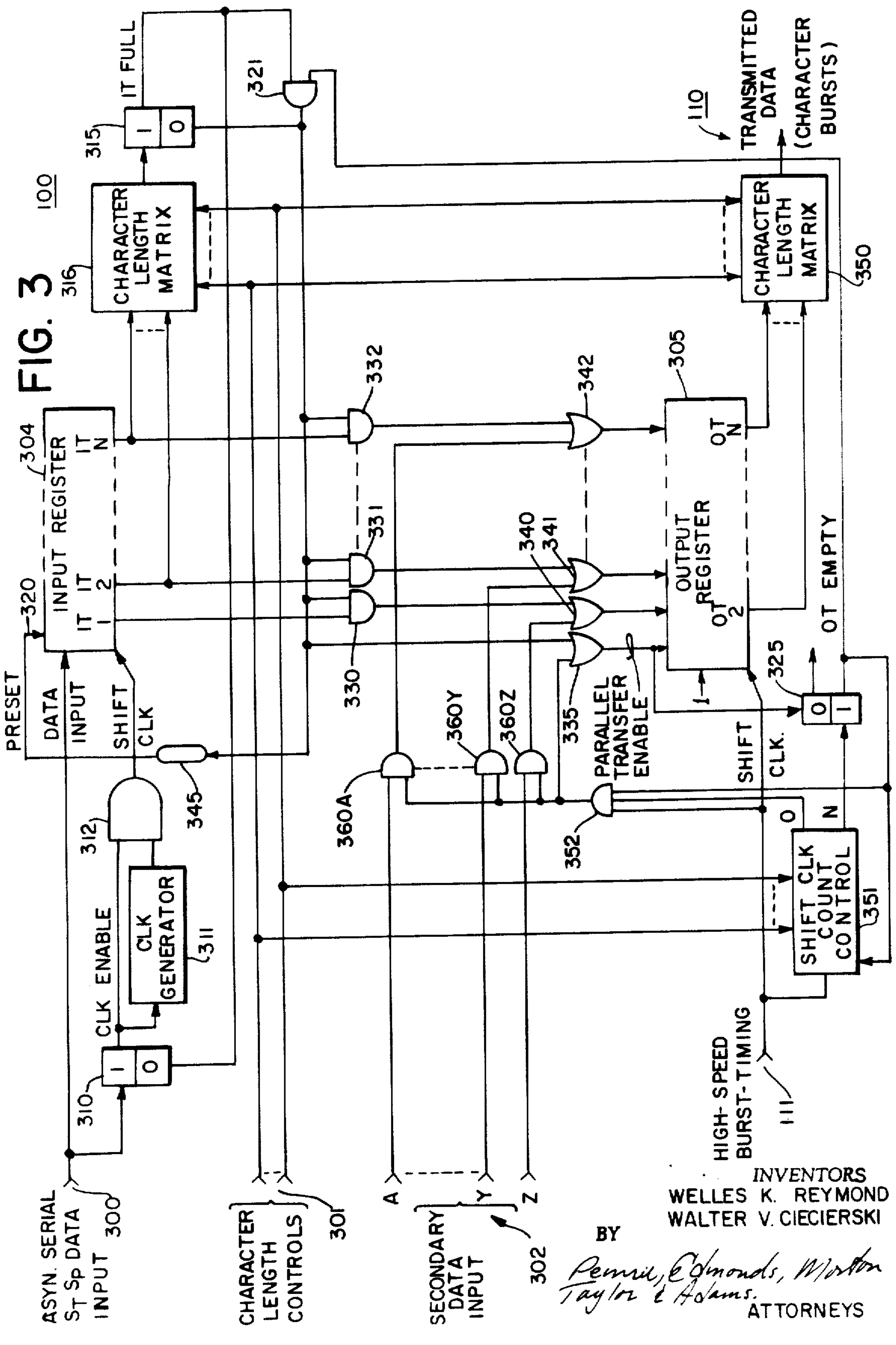
FIG. 3 is a functional block diagram of the transmitting asynchronous data buffer provided by the invention.

A preferred embodiment of an asynchronous buffer 100 provided by this invention is shown in FIG. 3. Inputs comprise digital start-stop data supplied to input 300, character length control signals supplied to 301, secondary digital test control data supplied to 302 and a gated high-speed burst clock signal supplied to 111. The character length control signals and high speed burst timing signals are supplied by a cooperating time-division synchronous multiplexer, preferably of the type described in the inventors' copending application Ser. No. 40,008 filed May 25, 1970 and entitled "Synchronous Programable Mixed Format Time Division Multiplexer."

Before describing the various operating functions of the data buffer itself, it should be pointed out that the general function performed by this unit is to temporarily store up to one character of start-stop data in an input register 304, transfer that data character to an output register 305 when the latter is empty and then transfer the stored character in 305 to output 110 into its appropriate frame time slot in the composite data stream in response to the periodic burst timing signal supplied to 111. In the absence of a complete character in 304, a complete character of secondary control data from 302 is transferred into register 305 and in turn shifted out in timed sequence by the burst timing signal into the assigned channel time slot. It will be recognized that the present buffer offers an important operating advantage in that the primary and secondary data are effectively combined in a single assigned channel time slot so that from the point of view of the overall transmission system there is only one source for each channel.

In operation, serial start-stop data having a known start-stop format (i.e., band rate, data bits per character and minimum stop pulse units) is supplied to the input register 304 the length of which is compatible with the longest serial input character that will be used in the system. A common preset to the register sets all stages to a logical "1." A "mark" on the data input is shifted in as a logical "1" and a space is shifted in as a logical "O." The true output of each stage of the register is available as an output signal IT1–ITN.

Arrival of a start pulse sets bistable 310 which enables clock generator 311 and provides a shift pulse via AND gate 312 corresponding to the ideal center of each incoming character bit. The start pulse of each incoming character causes the appropriate output stage to become a logical "0" as the incoming character is serially shifted into the input register. Bistable 315 is set when a logical "0" is present in the output IT stage corresponding to the number of data bits plus one that are used in the machine delivering the particular start-stop character input and thus functions to indicate when the input register is full. For a start-stop character comprising a "start" pulse, 5 data bits and a "stop" pulse, the IT full bistable 315 is set when the incoming "start" pulse is shifted into and sets the sixth stage IT6 of the input register 304 to logical "0." The "-stop" pulse of each incoming character is thus removed. Bistable 315 is controlled by character length matrix 316 which consists of multi-wide two-input AND-OR gates. The width of the gates is determined by and corresponds to the number of different character length start-stop serial data inputs to be accommodated in the system.

As shown in FIG. 3, one input to each two-input AND gate in 316 is a character length control signal supplied by fixed straps or an external source such as the cooperating synchronous time division multiplexer. The second input to each two-input AND gate is the appropriate IT state output which indicates when the input register is full. It will be apparent that matrix 316 can be readily programed to accommodate input start-stop characters having any predetermined number of bits.

When bistable 315 is set, its output functions to reset the clock enable bistable 310 and input register 304 holds the full character until a preset signal is delivered to preset input 320. The latter signal is generated by transfer control AND gate 321 which is operated by coincident signals from bistable 315 (input register full) and bistable 325 (output register empty). The output of 321 is supplied to one input of AND gates 330, 331, 332, the other inputs being connected to the outputs IT1–ITN of 304. When transfer gate 321 is actuated, bistable 315 is reset, a transfer enable signal is supplied to output register 305 via OR gate 335, output empty bistable 325 is reset, input register 304 is preset through time delay 345 and the character in 304 is parallel transferred via OR gates 340, 341, 342 to output register 305.

When both the input and output registers are empty, secondary data inputs A–Z at 302 are transferred to the appropriate stages of output register 305 such that a logical "1" (Mark) is always inserted in the OT stage connected as output data through character length matrix 350 to output 110.

Transfer of the secondary data occurs at the leading edge of the first high speed burst timing pulse when the OT empty signal is present from bistable 325.

Shift clock count control 351 is provided to keep track of the high speed burst timing signal presented to the transmitter at input 111. In its reset state the "0" count detection is provided as a control signal to AND gate 352 together with the empty reset signal from 325 and burst timing from 111. Operation of GATE 352 effects transfer of the secondary data inputs through AND gates 360A–Z and OR gates 340–342 to the output register 305. At the same time, an output signal from AND gate 352 is supplied to the parallel transfer enable input of 305 and to the reset input of bistable 325.

Character length control signals from input 301 are supplied to 351 and at the count of N, corresponding to the character length of the particular start-stop data input signal, an N count signal is provided to set the OT empty bistable. An indication is thereby provided that the previously transferred character has been shifted out of the output register and the count control is reset by 325. The next parallel transfer enable signal resets 325 and the cycle is repeated.

Figure 4:
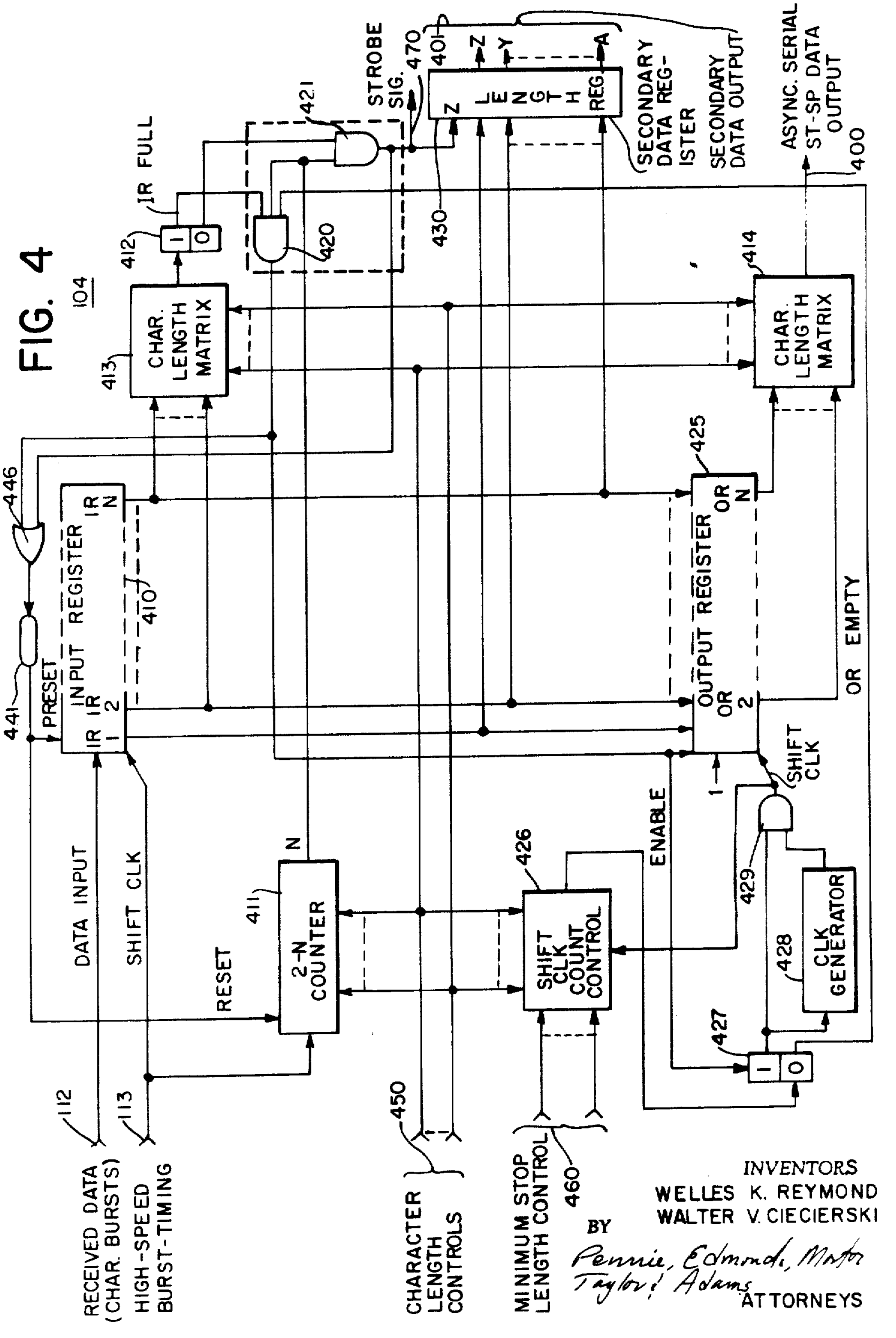
FIG. 4 is a functional block diagram of the receiving asynchronous data buffer provided by the invention.

The receiver asynchronous buffer 104 shown in FIG. 4 functions to separate character bursts of primary data from character bursts of secondary data supplied to input 112 by a synchronous demultiplexer 103 and deliver the primary data to the channel sink 400 and the secondary data to its intended output 401. Logic circuits in the receiver buffer 104 uniquely identify each incoming character as either primary or secondary data depending upon whether the initial indicator bit is a space or a mark as shown in FIG. 2.

The receiver data buffer comprises five principal sections, namely, an input register 410 with its timing controls counter 411 and bistable 412; character length matrices 413 and 414; control AND gates 420 and 421 for transferring characters from the input register to either the output register 425 or the secondary data register 430; and the output register 425 and its associated timing controls which include shift clock count control 426, bistable 427, clock generator 428 with AND gate 429.

Register 410 is an N-length serial shift register compatible with the longest input character to be used in the system. A common preset supplied through OR gate 446 and time delay 441 from either 420 and 421 sets all stages of the register to logical "1." The true output of each stage IR1–IRN is supplied as inputs to both the output register 425 and the secondary data register 430 as shown. A mark on the received data input is shifted in as a logical "1" and a space is shifted in as a logical "0." Bistable 412 is set when a logical "0" is present in the IR stage corresponding to the number of data bits plus one that are present for a particular channel (i.e., data bits plus one indicator bit). It will be recalled from the description of FIG. 2 that the first bit (indicator) of the primary data character is always transmitted as a space (logical 0) and the first bit of the secondary data character is always transmitted as a mark (logical 1). The occurence of a an IR full signal out of 412 indicates that the input register contains a primary character that should be transferred to output register 425 and finally through character length matrix 414 to output 400. Character length matrices 413 and 414 consist of multi-wide two-input AND-OR gates. The width of the gates corresponds to the number of different character length primary data inputs that exist in the system. One input to each two-input AND is a character length control signal supplied to input 450 from a fixed internal source or an external source such as the receiver demultiplexer. For matrix 413, the second input to each two-input AND is the appropriate IR stage output (1–N) corresponding to the desired character length. Thus when a logical "0" appears as the second input in coincidence with the character length control signal, 413 is set and an IR full indication signal is provided as one input to AND gate 420. A second input is supplied to 420 by the "N" count output of counter 411 which indicates that the input register is full with a composite data character. The third input to AND gate 420 is supplied by bistable 427 when the output register 425 is empty.

Transfer of a primary data character from input register 410 to output register 425 takes place when all three inputs are supplied to AND 420 which supplies a delayed preset signal to 410 and 411 and a parallel transfer enable signal to 425.

The parallel-transfer enable signal conveys the logical state ("1" or "0") existing on the parallel input to each register state into the particular stage and the true output of each stage of the register (OR1–ORN) is available as an output signal.

Clock generator 428 is enabled by the set of bistable 427 and provides shift clock pulses to the output register at a rate consistent with the primary data rate into the transmitter. Shift clock pulses are also provided as an input to shift clock count control 426 which determines the number of shift pulses provided to the output register consistent with the number of data bits and the minimum number of stop pulses associated with a particular primary data character in the system. As shown, stop length control pulses are supplied to 426 at input 460 from a local fixed strap or external source such as the associated synchronous demultiplexer. Similarly character length control signals are supplied to input 450 and are used to define the number of character data bits and control 426 delivers a reset signal to bistable 427 after the minimum count requirement for each of the above conditions is met.

Transfer of a secondary data character from the input register 410 to register 430 is effected when counter 411 provides an N count output signal to AND gate 421 and the IR full signal has not been generated. Under these circumstances AND gate 421 is actuated by the zero output of bistable 412 and a parallel transfer enable signal is supplied to secondary data register 430 enabling the transfer of each secondary character from 410 to 430. The output of gate 421 is also delivered to terminal 470 as a strobe signal for use with the digital filter shown in FIGS. 5 and 6.

From the foregoing explanation, it will be seen that the inventors' programable asynchronous data buffers and formatters provide a very useful function of inserting secondary control data pulses into the assigned channel time slot whenever primary data is unavailable from the channel source and then separating that secondary data from the primary data and directing it to a separate output where it can be used to perform a variety of desired supervisory or test control functions for the individual channel.

Figure 5:
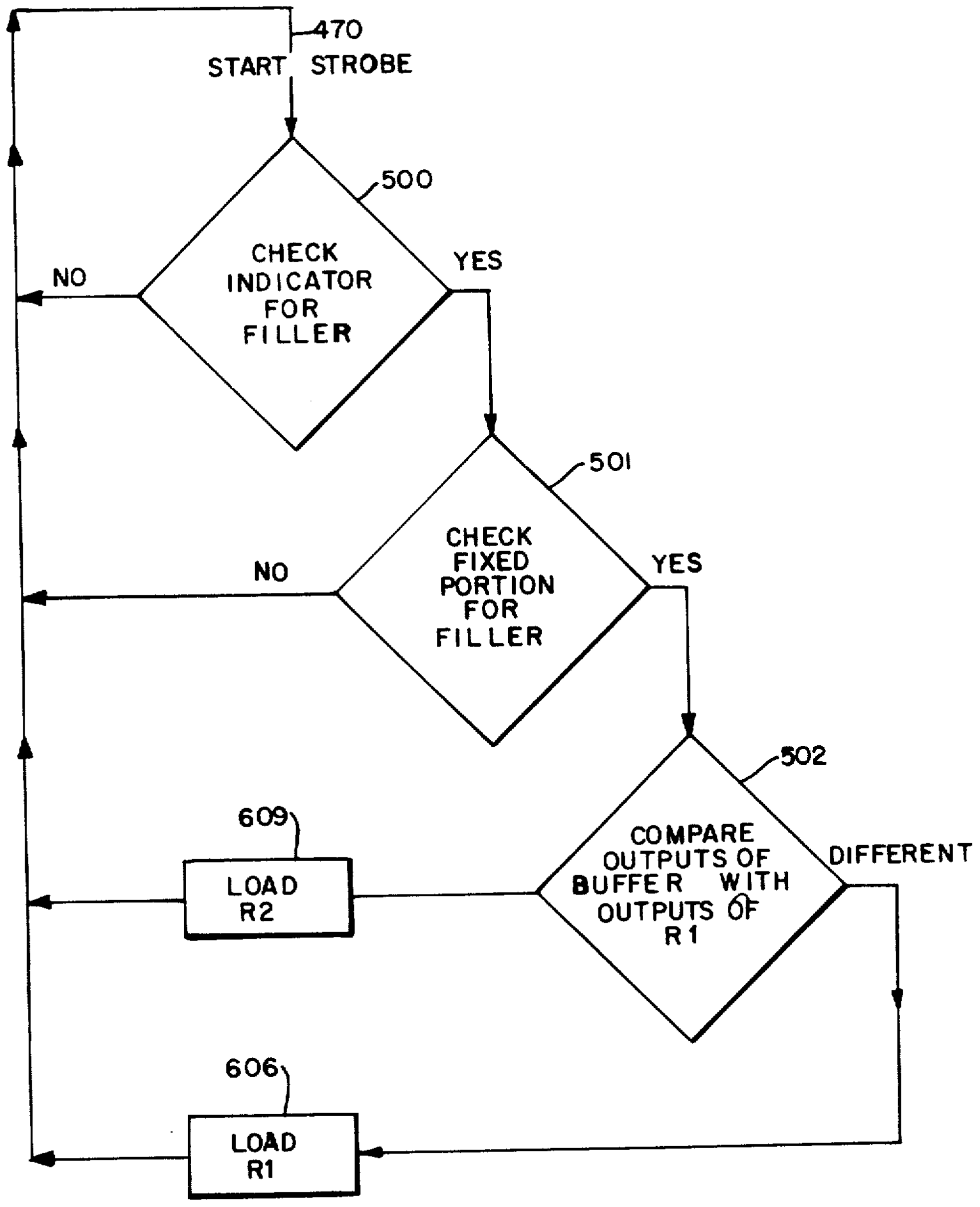
FIG. 5 is a flow diagram illustrating the method provided to protect transmitted secondary data control signals against error.
Figure 6:
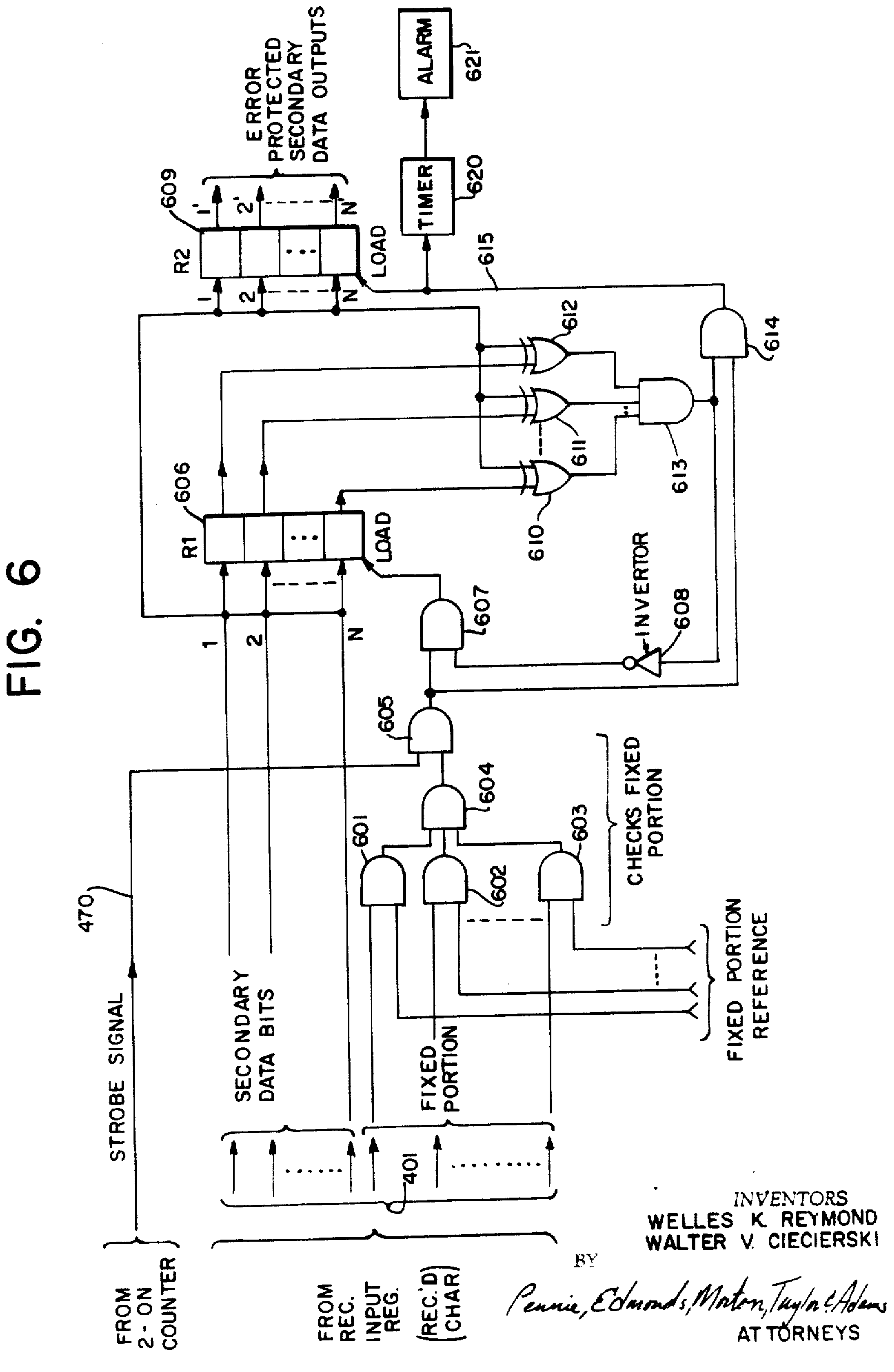
FIG. 6 is a functional block diagram of digital filter apparatus for carrying out the protection steps shown in FIG. 5.

In accordance with a further principal feature of the present invention, an extremely reliable method and means are provided for validating the identity of inserted secondary digital data before any testing action or the like can be taken that might erroneously interrupt the transmission of primary data through the channel. The protective method steps that are utilized to positively identify secondary data are shown in FIG. 5 and a logic diagram illustrating a preferred digital filter for practicing the method is shown in FIG. 6. Referring to the flow chart in FIG. 5, it will be seen that error protection is afforded by providing three separate and independent checks of secondary data character bits. First, the presence of a mark indicator bit 200C (see FIG. 2) is checked as indicated at 500. Secondly, the presence of preassigned fixed format fillers 234 and 220 (see FIG. 2) is checked at 501. If the first two checks are positive, the secondary data character is retained in a first buffer R1 and a second occurrence of the character is only advanced to a final output register R2 for operational use after a positive comparison is made at 502 between two successive transmissions of inserted control bits 200 CB (see FIG. 2).

A preferred means for providing the desired three step validation comparison is shown in FIG. 6. The first step of identifying the presence of a secondary data indicator bit (mark) is completed in the receiver and delivered as a strobe signal via 470 to one input of AND gate 605. Fixed portions of the received secondary data character from 401 are compared with fixed portion reference signals (corresponding to "ones" or zeros of the fixed format) supplied as inputs to AND gates 601–603. Correlation of the fixed format portions of the character actuates AND gate 604 and the presence of its output signal together with the strobe signal as inputs to AND gate 605 causes AND gate 607 to present a load signal to register 606. The secondary data bits are thus transferred into register 606 (R1) the true outputs of which are compared with the next transmission of the same secondary control bits by the operation of exclusive OR circuits 610, 611 and 612, the outputs of which are supplied as inputs to AND gate 613. If the comparison is positive (i.e., all programmed control bits are the same), AND gate 614 is actuated, a load signal is delivered on line 615 to 609, the control bits are loaded into register 609 (R2) and the true outputs are then available to perform their designated test or control functions as required. Since some of the desired test functions could include automatic test operations which would interrupt normal data transmission through the channel, the importance of providing error protection will be appreciated by those skilled in the art.

As indicated above, the preferred format for a secondary data character includes at least one space 220 (see FIG. 2). The transmission of all marks during a secondary data character is a prohibited condition and can be automatically sensed to sound a system alarm 621. As illustrated in FIG. 6, timer 620 actuates alarm 621 unless it is periodically reset by load pulses received on line 615.

Because of the fact that secondary data control signals for each channel are handled by most of the same individual channel logic circuits and are transmitted by the same time slots in the composite stream as the primary data, extremely useful validation tests can be performed. For example, a pair of secondary data inputs (one being transmitted in each direction in a full duplex system) can be looped back at the far end of a channel in a time division multiplex system so that a highly reliable validation test of a channel's proper operation can be performed at the near end by observing the correct round trip transmission of the secondary data. Most importantly, the test can be performed without in anyway interfering with the transmission of primary data and, significantly, the test can be performed from either end of the duplex system using only one secondary data control signal in each direction.

Figure 7:
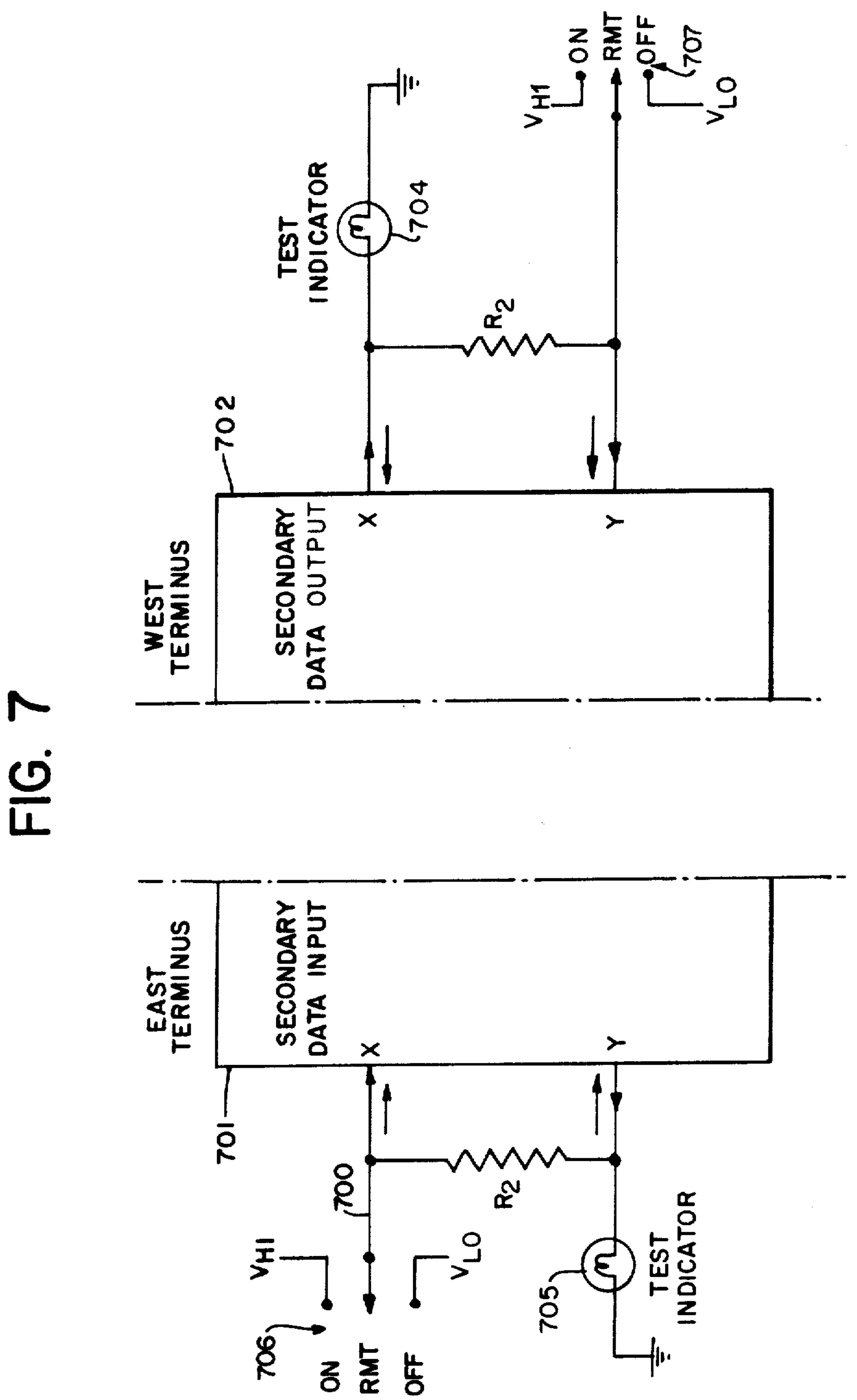
FIG. 7 is a simplified block diagram illustrating the operation of an in-service closed loop channel test performed under control of transmitted secondary control data.

The operation of an in-service channel validation test in accordance with the method and apparatus of the present invention is illustrated in FIG. 7. As shown in simplified block form, a single channel comprises an east terminus 701 having a secondary data input X, a test switch 706, a test indicator lamp 705 and a west terminus 702 having a secondary data output X connected to indicator lamp 704 and a test switch 707. The secondary data output "X" of terminal 702 is connected to input "Y" by resistor $R_2$ and the secondary data output "Y" of 701 is connected to the input "X" by $R_2$ at the east terminal. When terminus switches 706 and 707 are each in the "remote" position, secondary data signals are looped back on each end by resistors $R_2$. Channel operation can be validated from either terminus without interrupting service simply by throwing the test switch (706 and 707) to the "on" position. Operation of the switch at either end overrides feedback at that end of the circuit sending a signal through the channel system which is looped back at the unswitched end and returned to energize the test indicator lamp. The in service validation test may then be terminated by momentarily throwing the test switch (i.e., 706 or 707) to the "off" position and then returning it to the normal unactuated "remote position."

While preferred embodiments of the apparatus and method provided by the present invention have been described, various modifications may be made without departing from the invention as defined in the appended claims.

We claim:

1. An asynchronous data buffer comprising
   a. an input register for receiving and storing a start-stop primary data character having from 1 to N bits;
   b. input means for receiving a secondary control data character having from 1 to N bits;
   c. an output transfer register coupled to said input register and said secondary control data receiving means for storing either of said primary or secondary data characters;
   d. first circuit means for generating an output signal when said output register is empty;
   e. second circuit means responsive to said input register for generating an input full signal when said input register is full;

f. first gate means coupled to said input register full signal generating means and to said output register empty signal generating means for transferring primary data from said input register to said output register when said input full and output empty signals are generated;

g. means for receiving an input high speed burst timing signal;

h. circuit means responsive to said burst timing signal receiving means and said output register empty signal generating means for transferring a secondary data character from said character receiving means into the output register when said input register is empty; and i. circuit means responsive to said high speed burst timing signal receiving means for shifting data in the output register to an output line.

2. Apparatus in accordance with claim 1 wherein a first identifying indicator bit is transmitted with said primary data and a second identifying indicator bit is transmitted with said secondary control data.

3. An asynchronous data buffer for receiving channel data including intermixed characters of primary data identified with a first indicator bit and secondary data characters identified with a second indicator bit, said apparatus comprising:

a. an input register for sequentially receiving and storing incoming primary and secondary data characters;

b. an output register for storing primary data characters to be delivered to a start-stop data receiving terminal;

c. a secondary register for storing secondary data characters to be delivered to a supervisory and control test terminal;

d. first circuit means associated with said input register for developing a primary data input to output register transfer control signal in response to a stored identifying first indicator bit;

e. second circuit means associated with said input register for identifying a secondary data indicator bit and producing a secondary data input to secondary data output register transfer control signal, f. means responsive to said first circuit means for transferring said primary data from said input register to said output register upon the occurrence of said primary data input to output register transfer signal, and g. means responsive to said second circuit means for transferring said secondary data from said secondary register to said output register upon the occurrence of said secondary data input to secondary data output register transfer control signal.

4. An asynchronous data buffer in accordance with claim 3 further comprising, means for supplying the data characters stored in said secondary register to a digital filter, the output of which supplies error protected control signals to a supervisory and control test terminal.

5. In an asynchronous data buffer for receiving channel data including intermixed characters of primary data and secondary data characters having at least one fixed filler bit, plural coded control bits and an identifying indicator bit, digital filter means for protecting against erroneous identification of said secondary data characters comprising:

a. first circuit means responsive to said indicator bit for producing a first validation control signal;

b. second digital comparator means for comparing the fixed filler bit of a secondary character with a fixed digital reference and producing on condition of identity a second validation control signal;

c. third digital comparator means for comparing the said plural coded control bits of successive transmissions of a secondary data character and producing on condition of identity a third validation control signal; and d. circuit means responsive to said first circuit means and said second and third comparators for transferring the received secondary data characters to an error protected output terminal upon the occurrence of said first, second and third validation control signals.

6. In the operation of an asynchronous data buffer for receiving channel data including secondary control data characters having at least one fixed filler bit, plural coded control bits and an identifying indicator bit, a method for protecting against erroneous identification of said secondary characters comprising the steps of:

a. testing a received character for the presence of an identifying indicator bit to develop a first validation control signal;

b. comparing the fixed portion of said character with a programmed reference to produce on condition of identity a second validation control signal;

c. comparing the plural coded control bits of a first received character with those in a second received character to produce on condition of identity a third validation control signal; and d. producing a character validation signal in response to the coincidence of said first, second and third validation control signals.

7. In the operation of an asynchronous data buffer for receiving channel data including secondary control data characters having an identifying indicator bit and plural coded control bits, a method for protecting against erroneous identification of said secondary characters comprising the steps of:

a. testing a received character for the presence of an identifying indicator bit to develop a first validation control signal;

b. comparing the plural coded control bits of a first received character with those in a second received character to produce on condition of identity a second validation control signal; and c. producing a character validation signal in response to the coincidence of said first and second control signals.

* * * * *